United States Patent [19]

Chacko et al.

[11] Patent Number: 4,689,365

[45] Date of Patent: Aug. 25, 1987

[54] HIGH TEMPERATURE RESISTANT POLYESTER COMPOSITIONS

[75] Inventors: Varkki P. Chacko, Summit; Gerald A. Baum, Paramus, both of N.J.

[73] Assignee: Celanese Engineering Resins, Inc., Chatham, N.J.

[21] Appl. No.: 860,265

[22] Filed: May 6, 1986

[51] Int. Cl.$^4$ ............................................. C08K 7/14
[52] U.S. Cl. ................................. 524/539; 524/513; 524/494
[58] Field of Search ................. 524/539, 513; 525/437

[56] References Cited

U.S. PATENT DOCUMENTS

| | | | |
|---|---|---|---|
| 4,251,429 | 2/1981 | Salee | 524/539 |
| 4,276,397 | 6/1981 | Froix | 524/539 |
| 4,365,037 | 12/1982 | Adachi et al. | 524/449 |
| 4,426,479 | 1/1984 | Deguchi et al. | 524/430 |
| 4,460,731 | 7/1984 | Kochanowski et al. | 524/539 |

*Primary Examiner*—Lewis T. Jacobs
*Attorney, Agent, or Firm*—Herbert P. Price

[57] ABSTRACT

Polyester molding composition containing polybutylene terephthalate, nucleated polyethylene terephthalate or mixtures thereof as well as thermally stable reinforcing fibers and polyphenylene sulfide having a melt flow rate of less than about 1,000.

9 Claims, No Drawings

HIGH TEMPERATURE RESISTANT POLYESTER COMPOSITIONS

BACKGROUND OF THE INVENTION

The invention relates to improvements in polyester molding compositions.

Polybutylene terephthalate (PBT) and polyethylene terephthalate (PET) have been widely used in molding compositions both with and without thermally stable reinforcing fibers such as glass fibers. Nucleated PET as described for instance in U.S. Pat. Nos. 4,357,268, 4,368,285 and 4,429,067 has also been frequently used in polyester molding compositions. Previously known polyester molding compositions of the type mentioned above, while satisfactory for many purposes, have been found unsatisfactory for use in applications such as electrical connecters where the heat and vapor from vapor phase soldering processes can affect the mechanical integrity of the plastic parts, resulting in undesirable conditions such as loosening of terminals, softening or melting of insulation, reflow of finishes at the contact areas and blistering and distortion of the part.

U.S. Pat. No. 4,251,429 discloses polyester molding compositions prepared from bisphenols and aromatic dicarboxylic acid such as isophthalic acid or terephthalic acid admixed with polyphenylene sulfide of the formula

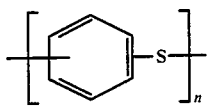

wherein n has a value of at least about 100. U.S. Pat. No. 4,140,671 discloses warp resistant, flame retarded, reinforced thermoplastic compositions comprising high molecular weight linear polyester resins such as polybutylene terephthalate and a warp resisting amount of polyphenylene sulfide powder, along with fiberglass, talc and flame retardants. Any of the commercially available polyphenylene sulfide powders are considered acceptable with the one known as Ryton V-1 sold by Phillips Petroleum Company being preferred. Ryton V-1 has a melt flow rate of about 4500.

SUMMARY OF THE INVENTION

It is an object of the present invention to provide polyester molding composition which provides adequate protection from the heat and vapor of vapor phase soldering processes so that the mechanical integrity and other desirable characteristics of parts molded from the molding composition are not adversely affected by the use of vapor phase soldering processes.

Polyester molding composition of the invention consists essentially of:

(a) between about 10 wt. % and about 90 wt. % polybutylene terephthalate having an intrinsic viscosity between about 0.5 and about 1.5 dl/g or nucleated polyethylene terephthalate having an intrinsic viscosity of at least about 0.4 dl/g or a mixture thereof;

(b) a reinforcing amount of thermally stable reinforcing fibers; and (c) polyphenylene sulfide having a melt flow rate of less than about 1,000, preferably less than about 100, in an amount sufficient to increase the resistance of the molding composition to vapor phase soldering processes.

In preferred embodiments the amount of PBT and nucleated PET present totals between about 25 wt. % and about 70 wt. % of the total composition and the polyester component of the composition comprises at least about 50 wt. % and even more preferably 100 wt. % PBT.

The invention also includes molded articles made from molding compositions of the invention.

DETAILED DESCRIPTION OF THE INVENTION

As noted above compositions of the invention include polybutylene terephthalate (PBT), nucleated polyethylene terephthalate (PET), or mixtures thereof as well as thermally stable reinforcing fibers and polyphenylene sulfide.

PBT used in the invention may be produced in any suitable manner such as by reacting terephthalic acid or a dialkyl ester of terephthalic acid, e.g., dimethyl terephthalate, with diols having four carbon atoms, e.g., tetramethylene glycol PBT for use in the invention has an intrinsic viscosity (I.V.) between about 0.5 and about 1.5 dl/g measured in orthochlorophenol at 25° C. Manufacture of PBT is well known to those skilled in the art as are the techniques for obtaining PBT of desired intrinsic viscosity. Such conventional production techniques for PBT are discussed in greater detail, for instance, in U.S. Pat. No. 2,465,319, the disclosure of which is incorporated herein by reference.

Nucleated PET for use in the invention is also produced in a conventional manner. Production of nucleated PET is described for instance in U.S. Pat. Nos. 4,357,268, 4,368,285 and 4,429,067 the disclosures of which are incorporated herein by reference. PET which has not been nucleated is generally not preferred but may be used in amounts of up to about 20 wt. % of the toal polyester used. PET used in the invention should have an intrinsic viscosity of at least about 0.4 dl/g and usually between about 0.4 and about 1.3 dl/g as measured in orthochlorophenol at 25° C.

Compositions of the invention also include thermally stable reinforcing fibers conventionally used in the production of PBT molding compositions. Glass fibers preferably treated with silane or other coupling agent are preferred reinforcing fibers but fibers of other materials such as aramid, calcium sulfate, aluminum metal, boron, carbon, fibrous potassium titanate, iron wiskers etc. may be used. Reinforcing fibers may be used in any amount sufficient to provide desired reinforcement. Fibers in amounts between about 5 and 50 wt. % and more preferably between about 20 wt. % and about 35 wt. % based on total molding composition are normally used. The fibers may be incorporated into the molding composition in any suitable manner such as by separate extrusion blending with previously formed compositions or by incorporating the fibers into the composition during injection molding of products. Reinforcing fibers used preferably have diameters between about 5 and about 20 microns and aspect ratios averaging between about 10 and about 50.

Polyphenylene sulfide is used in compositions of the invention in amounts sufficient to increase the vapor phase soldering resistance of the composition. This will normally require the use of between about 5 wt. % and about 50 wt. %, more preferably between about 10 wt. % and about 25 wt. %, polyphenylene sulfide based on total molding composition. As mentioned above the polyphenylene sulfide used must have a melt flow rate of less than about 1,000 as measured by ASTM D-1238, procedure B modified to use a 5 Kg weight, 600° F. (316° C.) and 0.0825 inch (0.17 mm) orifice. In preferred embodiments the polyphenylene sulfide has a melt flow rate of less than about 100. Such polyphenylene sulfides and their preparation are well known and are described for instance in U.S. Pat. Nos. 3,354,129, 4,251,429, 4,039,5518 and 4,089,847. A particularly preferred polyphenylene sulfide is sold by Phillips Petroleum under the tradename Ryton P-4. As with the reinforcing fibers, the polyphenylene sulfide used in the invention may be incorporated into the composition in any suitable manner such as by separate blending or by incorporation during injection molding of products.

Use of polyphenylene sulfide having a melt flow rate of less than about 1,000 is believed to result in improved dimensional stability, reduced injection mold flashing, impact resistance and melt strength. In addition, low levels of volatiles (generally less than 0.4%) can be maintained during vapor phase soldering so that blistering is reduced.

Compositions of the invention may also contain suitable flame retardant additives in amounts up to about 20 wt. % based on total composition. In addition, compositions of the invention may contain additional additives such as antioxidants, colorants, lubricants, stabilizers, plasticizers etc. which do not unduly effect the desired characteristics of the finished product. Where present such additional materials normally comprise no more than about 5 wt. % of the total composition.

Compositions of the invention may also contain impact modifiers in amounts up to about 20 wt. % based on the total of PBT and PET used, more usually in amounts of between about 5 and about 15 wt. % on the same basis. Preferred impact modifiers are of the multiphase type, commonly known as core-shell polymer. Particularly preferred types of modifier are core-shell polymers polymerized from monomers comprising butadiene or core-shell polymer of the acrylate type such as those disclosed in U.S. Pat. No. 4,096,202, the disclosure of which is incorporated herein by reference. Acrylate type core-shell polymer suitable for use in compositions of the invention is available from Rohm and Haas Company under the tradename Paraloid KM-330.

Butadiene-type core-shell polymers suitable for use in compositions of the invention are described for instance in U.S. Pat. No. 4,180,494, the disclosure of which is incorporated herein by reference. Butadiene type core-shell modifiers suitable for use in compositions of the invention are available for instance from Rohm and Haas Company under the tradename Paraloid KM-653 and from M & T Chemicals under the designation Metablen C-223.

EXAMPLES

In order to evaluate molding compositions of the invention, molding compositions having ingredients specified in Table I were prepared and molded into test boxes which were then subjected to high temperature in air ovens to determine suitability for use with vapor phase soldering. Results of these tests are also shown in Table I in terms of pass or fail. For these tests passing meant that the box exhibited no distortion or sagging and no more than minor blistering.

In the following Examples the following terms have the meanings given below.

| Term | Description |
| --- | --- |
| PBT | Polybutylene terephthalate having an intrinsic viscosity of 0.7–0.8 deciliters per gram (dl/g) as measured in orthochlorophenol at 25° C. |
| P064P | Poly(2,6-dibromophenylene oxide obtained from Great Lakes Chemical Co. |
| Ryton P-4 | Polyphenylene sulfide obtained from Phillips Petroleum Company and having a melt flow rate of about 60. |
| Glass Fibers | E glass obtained from Owens-Corning Fiberglass and identified as grade 408AA. |
| $Sb_2O_3$ | Antimony oxide, ultrafine grade, obtained from Laurel Industries, Inc. |
| Polysulfone | Udel P-1700 obtained from Union Carbide Corporation. |

The molding compositions referred to in the Examples were prepared by first drying all ingredients as necessary and then extruding the blend of ingredients on a Hartig single screw extruder. The resulting extruder blends were dried thoroughly and test boxes were molded on a 3 ounce Van Dorn injection molding machine using barrel temperatures of about 250° C.–300° C. Molding conditions included melt temperatures of 510°–530° F. and mold temperatures of about 100°–180° F. The test boxes were 5-sided endgated boxes with walls measuring 1/16 inch thick. The boxes measured 3 inches long, ½ inch wide and ¾ inch deep.

The test procedure involved placing the molded boxes in a circulating air oven maintained at 450° F. for 10 minutes (Test A). Boxes which passed Test A were then placed in an air oven at 470° F. for 10 minutes (Test B). The test temperatures of 450° F. and 470° F. were chosen as being representative of typical vapor phase soldering processes.

TABLE 1

| INGREDIENTS | EXAMPLE NO. | | | | | | |
| --- | --- | --- | --- | --- | --- | --- | --- |
| (wt. %) | 1 | 2 | 3 | 4 | 5 | 6 | 7 |
| PBT | 35.7 | 23.7 | 23.7 | 33.7 | 39.7 | 29.7 | 44.6 |
| Glass Fiber | 45 | 35 | 35 | 35 | 35 | 35 | 35 |
| Ryton P-4 | | | 22 | 12 | 10 | 20 | 20 |
| PO64P | 12.6 | 12.6 | 12.6 | 12.6 | 10 | 10 | |
| $Sb_2O_3$ | 6.3 | 6.3 | 6.3 | 6.3 | 5 | 5 | |
| Polysulfone | | 22 | | | | | |
| Other | 0.4 | 0.4 | 0.4 | 0.4 | 0.3 | 0.3 | 0.4 |
| Results | | | | | | | |
| Test A | Fail | Fail | Pass | Pass | Pass | Pass | Pass |
| Test B | — | — | Pass | Pass | Pass | Pass | Pass |

From the data presented in Table I above it can be seen that the inclusion of polyphenylene sulfide allowed compositions of the invention to pass both Tests A and B where similar compositions without the polyphenylene sulfide were unable to pass even Test A.

While the invention has been described above with respect to preferred embodiments thereof, it will be understood by those skilled in the art that various changes and modifications may be made without departing from the spirit or scope of the invention.

What is claimed is:

1. Polyester molding composition consisting essentially of:
   (a) between about 25 weight percent and about 70 weight percent polybutylene terephthalate having an intrinsic viscosity between about 0.5 and about 1.5 dl/g or nucleated polyethylene terephthalate having an intrinsic viscosity of at least about 0.4 or a mixture thereof;

(b) between about 5 weight percent and about 50 weight percent of thermally stable reinforcing fibers; and (c) between about 5 weight percent and about 50 weight percent polyphenylene sulfide having a melt flow rate of less than about 1,000 said amount being sufficient to increase the resistance of the molding composition to vapor phase soldering processes;

wherein said weight percents are based on the weight of the molding composition.

2. Molding composition according to claim 1 wherein the reinforcing fibers are glass fibers.

3. Molding composition according to claim 2 wherein at least about 50 weight percent of the total of polybutylene terephthalate and polyethylene terephthalate is polybutylene terephthalate.

4. Molding composition according to claim 3 which also contains up to about 20 wt. % flame retardant based on total composition.

5. Molding composition according to claim 3 wherein the polyphenylene sulfide has a melt flow rate of less than about 100.

6. Molding composition according to claim 3 wherein 100 wt. % of the total of polybutylene terephthalate and polyethylene terephthalate is polybutylene terephthalate.

7. Molding composition according to claim 5 which also contains between about 5 and about 15 wt. % impact modifier based on the total of polybutylene terephthalate, polyethylene terephthalate and impact modifier, said impact modifier being selected from the group consisting of:

(1) core-shell polymer comprising about 25 to about 95 wt. % of a first elastomeric phase polymerized from a monomer system comprising about 75 to 99.8% by weight $C_1$ to $C_6$ alkyl acrylate, 0.1 to 5% by weight crosslinking monomer, and 0.1 to 5% by weight graftlinking monomer, said crosslinking monomer being a polyethylenically unsaturated monomer having a plurality of addition polymerizable reactive groups all of which polymerize at substantially the same rate of reaction, and said graftlinking monomer being a polyethylenically unsaturated monomer having a plurality of addition polymerizable reactive groups, at least one of which polymerizes at a substantially different rate of polymerization from at least one other of said reactive groups; and about 75 to 5 wt. % of a final, rigid thermoplastic phase polymerized in the presence of said elastomeric phase; and (2) butadiene based core-shell polymer formed between a butadiene polymer where butadiene units account for at least 50 mole % of the total polymer and at least one vinyl monomer.

8. A molded article made from the molding composition of claim 1.

9. A molded article made from the molding composition of claim 3.

* * * * *